United States Patent
Ao et al.

(10) Patent No.: US 9,736,060 B2
(45) Date of Patent: Aug. 15, 2017

(54) METHOD AND DEVICE FOR NEGOTIATING TRAFFIC PATH IN LINK AGGREGATION GROUP

(71) Applicant: ZTE Corporation, Shenzhen (CN)

(72) Inventors: Ting Ao, Shenzhen (CN); Yuehua Wei, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 250 days.

(21) Appl. No.: 14/437,051

(22) PCT Filed: Sep. 27, 2013

(86) PCT No.: PCT/CN2013/084522
§ 371 (c)(1),
(2) Date: Oct. 15, 2015

(87) PCT Pub. No.: WO2014/059873
PCT Pub. Date: Apr. 24, 2014

(65) Prior Publication Data
US 2015/0381474 A1    Dec. 31, 2015

(30) Foreign Application Priority Data
Oct. 19, 2012  (CN) .......................... 2012 1 0401321

(51) Int. Cl.
*H04L 29/08*    (2006.01)
*H04L 12/709*   (2013.01)

(52) U.S. Cl.
CPC ............ *H04L 45/245* (2013.01); *H04L 67/14* (2013.01); *Y02B 60/33* (2013.01)

(58) Field of Classification Search
USPC ...................................... 709/227, 221, 250
See application file for complete search history.

(56) References Cited

U.S. PATENT DOCUMENTS 7,197,038 B1 * 3/2007 Cook ...................... H04L 12/14
                                                370/400
7,881,192 B2 * 2/2011 Sultan ................. H04L 12/2852
                                                370/230
(Continued)

FOREIGN PATENT DOCUMENTS

CN        1725761 A     1/2006
CN      101014005 A     8/2007
(Continued)

OTHER PUBLICATIONS

International Search Report for corresponding application PCT/CN2013/084522 filed Sep. 27, 2013; Mail date Dec. 12, 2013.

*Primary Examiner* — Jude Jean Gilles
(74) *Attorney, Agent, or Firm* — Cantor Colburn LLP (57) ABSTRACT

Provided are a method and device for negotiating a traffic path in an LAG, wherein the method includes that an aggregation port acquires indication information, wherein the indication information is used for indicating one or more groups of services or sessions needing to be borne by the aggregation ports, each group of the services or sessions includes one or more services or sessions; the aggregation port determines multiple groups of services or sessions to be borne, and/or services or sessions currently being borne by the aggregation port; an aggregation group portal to which the aggregation port belongs, performs traffic distribution according to services or sessions currently being borne by each aggregation port which belongs to the aggregation group portal. It is solved the problem in the related art that the same service or session cannot be transmitted bi-directionally on the same path, thus implementing the protection on the interconnect interface.

20 Claims, 3 Drawing Sheets

(56) References Cited

U.S. PATENT DOCUMENTS

| | | | | |
|---|---|---|---|---|
| 2003/0204846 | A1* | 10/2003 | Breen | H04N 5/44543 |
| | | | | 725/39 |
| 2003/0206548 | A1* | 11/2003 | Bannai | H04L 12/42 |
| | | | | 370/389 |
| 2005/0228880 | A1* | 10/2005 | Champlin | G06F 11/3495 |
| | | | | 709/224 |
| 2009/0150808 | A1* | 6/2009 | Aldrey | H04N 5/44543 |
| | | | | 715/764 |
| 2014/0115189 | A1* | 4/2014 | Ao | H04L 45/245 |
| | | | | 709/250 |

FOREIGN PATENT DOCUMENTS

| CN | 101022456 A | 8/2007 |
|---|---|---|
| CN | 101605091 A | 12/2009 |

* cited by examiner

Fig. 5 though a port aggregation method. A common method may be the port aggregation method and may be also a loop protection method. A standard commonly applied in the link aggregation method at present supports the port aggregation on one node, thus the link aggregation method can be only applied to link protection. It can not to implement the protection required for a node on a network edge interface through the current link aggregation technology.

METHOD AND DEVICE FOR NEGOTIATING TRAFFIC PATH IN LINK AGGREGATION GROUP

TECHNICAL FIELD

The disclosure relates to the field of communications, including e.g., a method and device for negotiating a traffic path in a Link Aggregation Group (LAG).

BACKGROUND

With the rapid development of broadband services, interconnection between networks are more and more used to bear more services. A link and a node on the link may be protected by various methods in a network according to the technology applied in the network. With growing demands and increasing requirements for protecting the traffic, some operators also proposes that it is need to protect the network interconnection. The protection here may be implemented through a port aggregation method. A common method may be the port aggregation method and may be also a loop protection method. A standard commonly applied in the link aggregation method at present supports the port aggregation on one node, thus the link aggregation method can be only applied to link protection. It can not to implement the protection required for a node on a network edge interface through the current link aggregation technology.

Therefore, in order to realize the diversification of the networking modes of a network interconnect area between networks, and the protection not only protection for a link, but also for an edge node, it is proposed by the Institute of Electrical and Electronics Engineers (IEEE) standards organization of the United State to extend the link aggregation, so as to realize the network interconnect protection demand with dual redundancy of links and nodes through a distributed LAG, i.e. a Distributed Resilient Network Interconnect (DRNI). That is, a portal of an aggregation group comprises a multiple nodes, and the aggregation links of the multiple nodes form an aggregation link group.

Figure 1:
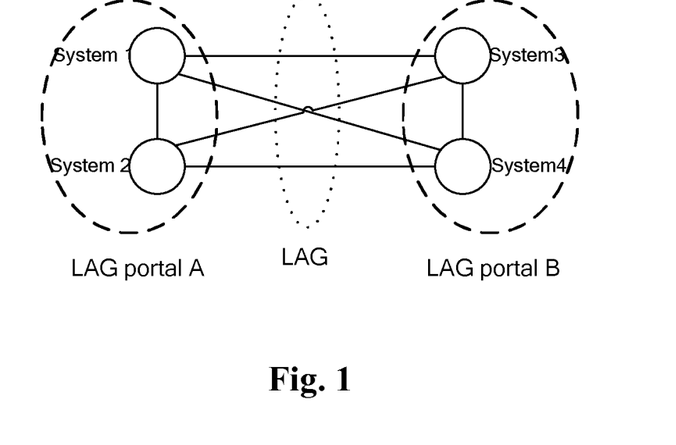
FIG. 1 is a schematic diagram illustrating connections of the network interconnect nodes according to the related art.

FIG. 1 is a schematic diagram illustrating connections of the network interconnect nodes according to the related art. As shown in FIG. 1, two portals A and B of an LAG are both provided with two nodes. The two nodes of Portal A of the LAG are System 1 and System 2, and the two nodes of Portal B of the LAG are System 3 and System 4. A multiple links of these four systems are aggregated to form an LAG. Dual protection of the links and nodes may be implemented through such a distributed LAG. System 1 and System 2 in Portal A of the LAG communicate through connection of an internal link, while System 3 and System 4 in Portal B of the LAG also communicate through an internal link.

Currently, in the DRNI, it is implemented to protect and share a load by distinguishing message services. However, it can be hardly ensured that the traffic of the same service can be transmitted on the same aggregation link due to that the traffic is distributed by two ends respectively, which is contradictory to the application of that the DRNI is used to protect the network interface and inconsistent with the demand of the Metro Ethernet Forum (MEF) for protecting of the network interface.

At present, there is no effective solution for the problem in the related art that the same service or session cannot be transmitted bi-directionally on the same path.

SUMMARY

According to the problem in the related art that the same service or session cannot be transmitted bi-directionally on the same path, a method and device for negotiating a traffic path in an LAG are provided in the embodiment of the disclosure, to at least solve the problem above.

A method for negotiating traffic path in an LAG is provided according to an aspect of the disclosure, comprising: acquiring, by an aggregation port, indication information, wherein the indication information is used for indicating one or more groups of services or sessions needing to be borne by the aggregation port, and each group of the services or sessions comprises one or more services or sessions; determining, by the aggregation port, multiple groups of services or sessions needing to be borne by the aggregation port, and/or services or sessions currently being borne by the aggregation port; performing, by an aggregation group portal to which the aggregation port belongs, traffic distribution according to services or sessions currently being borne by each aggregation port which belongs to the aggregation group portal.

According to an embodiment of the disclosure, the services or sessions currently being borne by the aggregation port is a group of services or sessions with a highest priority among the multiple groups of services or sessions.

According to an embodiment of the disclosure, in the aggregation group portal to which the aggregation port belongs, each service or session corresponds to one aggregation port sequence, wherein the aggregation port sequence is formed by sequencing aggregation ports in the aggregation group portal.

According to an embodiment of the disclosure, the multiple groups of services or sessions needing to be borne by the aggregation port are determined according to that the each service or session in the aggregation group portal corresponds to one aggregation port sequence.

According to an embodiment of the disclosure, multiple aggregation ports in the aggregation port sequence are sequenced according to priorities for bearing the services or sessions.

According to an embodiment of the disclosure, the multiple groups of services or sessions needing to be borne by the aggregation port are formed by services or sessions corresponding to aggregation ports with different priorities in all aggregation port sequences.

According to an embodiment of the disclosure, the aggregation group portal to which the aggregation port belongs, according to a predetermined strategy, modifies or sets the multiple groups of services or sessions needing to be borne by the aggregation port, and/or determines the services or sessions currently being borne by the aggregation port.

According to an embodiment of the disclosure, determining, by the aggregation port, the multiple groups of services or sessions needing to be borne by the aggregation port comprises: modifying, by the aggregation group portal to which the aggregation port belongs, according to a predetermined strategy, the multiple groups of services or sessions needing to be borne by the aggregation port; determining, by the aggregation port, according to the multiple groups of services or sessions modified by the aggregation group portal, the multiple groups of services or sessions needing to be borne by the aggregation port.

According to an embodiment of the disclosure, modifying, by the aggregation group portal, according to the predetermined strategy, the multiple groups of services or sessions needing to be borne by the aggregation port comprises: based on that the multiple groups of services or sessions currently being borne by the aggregation port are inconsistent with the services or sessions indicated in the indication information, judging, by the aggregation group portal to which the aggregation port belongs, whether the multiple groups of services or sessions currently being borne by the aggregation port need to be modified, by comparing a priority of the aggregation group portal with a priority of an aggregation group portal to which an opposite-end aggregation port of the aggregation port belongs; or judging, by the aggregation group portal to which the aggregation port belongs, according to a master-slave relationship, whether the multiple groups of services or sessions currently being borne by the aggregation port need to be modified according to the indication information.

According to an embodiment of the disclosure, judging, by the aggregation group portal to which the aggregation port belongs, according to priority relationship or master-slave relationship of the aggregation group portal, whether the multiple groups of services or sessions currently being borne by the aggregation port need to be modified according to the indication information comprises: based on that the priority of the aggregation group portal to which the aggregation port belongs is lower than the priority of the aggregation group portal to which the opposite-end aggregation port of the aggregation port belongs, or the aggregation group portal to which the aggregation port belongs is subordinate to the aggregation group portal to which the opposite-end aggregation port of the aggregation port belongs, modifying, by the aggregation group portal, according to the indication information, the multiple groups of services or sessions currently being borne by the aggregation port.

According to an embodiment of the disclosure, setting, by the aggregation group portal to which the aggregation port belongs, according to the predetermined strategy, the, multiple groups of services or sessions needing to be borne by the aggregation port comprises: based on that services or sessions currently being borne by the aggregation port have not been formed on the aggregation port, setting, by the aggregation group portal to which the aggregation port belongs, according to the indication information, the multiple groups of services or sessions currently being borne by the aggregation port.

According to an embodiment of the disclosure, the method further comprises: when one or more aggregation links corresponding to the aggregation port malfunction or are unavailable, or are separated from an aggregation link group, shielding, by the aggregation group portal to which the aggregation port belongs, the aggregation port corresponding to the one or more aggregation links from an aggregation port sequence, which corresponds to the services or sessions currently being borne by the aggregation port.

According to an embodiment of the disclosure, the method further comprises: when the one or more aggregation links corresponding to the aggregation port are restored to be used or join the aggregation link group again, determining, by the aggregation group end point, a protection mode; when the protection mode is a non-revertive mode, adding the aggregation port corresponding to the one or more aggregation links to the aggregation port sequence.

According to an embodiment of the disclosure, the method further comprises: when the one or more aggregation links corresponding to the aggregation port are restored to be used or join the aggregation link group again, determining, by the aggregation group portal, a protection mode; when the protection mode is a revertive mode, recovering the aggregation port corresponding to the one or more aggregation links in the aggregation port sequence.

According to an embodiment of the disclosure, the method further comprises: when the protection mode is the revertive mode, a change of the aggregation port sequence triggers a change of the services or sessions currently being borne on the aggregation port.

According to an embodiment of the disclosure, the indication information is a Type Length Value, TLV, field.

According to an embodiment of the disclosure, the indication information is carried in a Link Aggregation Control Protocol, LACP, message.

According another aspect of the embodiment of the disclosure, a device for negotiating traffic path negotiation in a Link Aggregation Group (LAG), comprising an aggregation port, and an aggregation group portal to which the aggregation port belongs, wherein the aggregation port comprises: an indication information acquiring component, configured to acquire indication information, wherein the indication information is used for indicating one or more groups of services or sessions needing to be borne by the aggregation port, and each group of the services or sessions comprises one or more services or sessions; a determining component, configured to determine multiple groups of services or sessions needing to be borne by the aggregation port, and/or services or sessions currently being borne by the aggregation port; the aggregation group portals comprises: a distributing component, configured to perform traffic distribution according to services or sessions currently being borne by each aggregation port which belongs to the aggregation group portal.

According to an embodiment of the disclosure, the services or sessions currently being borne by the aggregation port is a group of services or sessions with a highest priority among the multiple groups of services or sessions.

According to an embodiment of the disclosure, in the aggregation group portal to which the aggregation port belongs, each service or session corresponds to one aggregation port sequence, wherein the aggregation port sequence is formed by sequencing aggregation ports in the aggregation group portal.

According to an embodiment of the disclosure, the multiple groups of services or sessions needing to be borne by the aggregation port are determined according to that the each service or session in the aggregation group portal corresponds to one aggregation port sequence.

According to an embodiment of the disclosure, multiple aggregation ports in the aggregation port sequence are sequenced according to priorities for bearing the services or sessions.

According to an embodiment of the disclosure, the multiple groups of services or sessions needing to be borne by the aggregation port are formed by services or sessions corresponding to aggregation ports with different priorities in all aggregation port sequences.

According to an embodiment of the disclosure, the aggregation group portal to which the aggregation port belongs, according to a predetermined strategy, modifies or sets, the multiple groups of services or sessions needing to be borne by the aggregation port, and/or determines the services or sessions currently being borne by the aggregation port.

According to an embodiment of the disclosure, the aggregation group portal further comprises: a modifying component, configured to modify according to a predetermined strategy, the multiple groups of services or sessions needing to be borne by the aggregation port; the determining component comprises: a determining element, configured to determine, according to the multiple groups of services or sessions modified by the modifying component, the multiple groups of services or sessions needing to be borne by the aggregation port.

According to an embodiment of the disclosure, the modifying component comprises: a modification determining element, configured to, based on that the multiple groups of services or sessions currently being borne by the aggregation port are inconsistent with the services or sessions indicated in the indication information, judge whether the multiple groups of services or sessions currently being borne by the aggregation port need to be modified, by comparing a priority of the aggregation group portal with a priority of an aggregation group portal to which an opposite-end aggregation port of the aggregation port belongs; or, a modification judging element, configured to judge, according to a master-slave relationship, whether the multiple groups of services or sessions currently being borne by the aggregation port need to be modified according to the indication information.

According to an embodiment of the disclosure, the modifying component further comprises: a first modifying element, configured to, based on that the priority of the aggregation group portal to which the aggregation port belongs is lower than the priority of the aggregation group portal to which the opposite-end aggregation port of the aggregation port belongs, or the aggregation group portal to which the aggregation port belongs is subordinate to the aggregation group portal to which the opposite-end aggregation port of the aggregation port belongs, modify according to the indication information, the multiple groups of services or sessions currently being borne by the aggregation port.

According to an embodiment of the disclosure, the modifying component further comprises: a second modifying element, configured to, based on that services or sessions currently being borne by the aggregation port have not been formed on the aggregation port, set according to the indication information, the multiple groups of services or sessions currently being borne by the aggregation port.

According to an embodiment of the disclosure, the aggregation group portal further comprises: a shielding component, configured to, when one or more aggregation links corresponding to the aggregation port malfunction or are unavailable, or are separated from an aggregation link group, shield the aggregation port corresponding to the one or more aggregation links from an aggregation port sequence, which corresponds to the services or sessions currently being borne by the aggregation ports.

According to an embodiment of the disclosure, the aggregation group portal further comprises: a first mode determining component, configured to determine, when the one or more aggregation links corresponding to the aggregation port are restored to be used or join the aggregation link group again, a protection mode; an adding component, configured to add, when the protection mode is a non-revertive mode, the aggregation port corresponding to the one or more aggregation links to the aggregation port sequence.

According to an embodiment of the disclosure, the aggregation group portal further comprises: a second mode determining component, configured to determine, when the one or more aggregation links corresponding to the aggregation port are restored to be used or join the aggregation link group again, a protection mode; a recovering component, configured to recover, when the protection mode is a revertive mode, the aggregation port corresponding to the one or more aggregation links in the aggregation port sequence.

According to an embodiment of the disclosure, when the protection mode is the revertive mode, a change of the aggregation port sequence triggers a change of the services or sessions currently being borne on the aggregation port.

In an embodiment of the disclosure, aggregation ports acquire indication information, wherein the indication information includes a multiple groups of services or sessions to be borne by the aggregation ports, wherein each group of services or sessions includes one or more services or sessions; the aggregation ports determine a multiple groups of services or sessions to be borne, and/or services or sessions currently being borne by the ports; aggregation group portals where the aggregation ports locate distribute traffic according to services or sessions currently being borne by each of the aggregation ports, thus solving the problem in the prior art that the same service or session cannot be transmitted bi-directionally on the same path, and implements protection on an interconnect interface.

BRIEF DESCRIPTION OF THE DRAWINGS

The accompanying drawings illustrated here are used for providing further understanding to the disclosure and constitute a part of the application. The example embodiments of the disclosure and the illustration thereof are used for explaining the disclosure, instead of constituting an improper limitation to the disclosure. In the accompanying drawings.

DETAILED DESCRIPTION OF THE EMBODIMENTS

The disclosure will be described in details hereinafter with reference to the accompanying drawings and in conjunction with the embodiments. It should be noted that, if there is no conflict, the embodiments in the application and the characteristics in the embodiments may be combined with each other.

A method and device for negotiating a traffic path in an LAG are provided in the embodiments of the disclosure, which will be introduced in details below through the embodiments.

Figure 2:
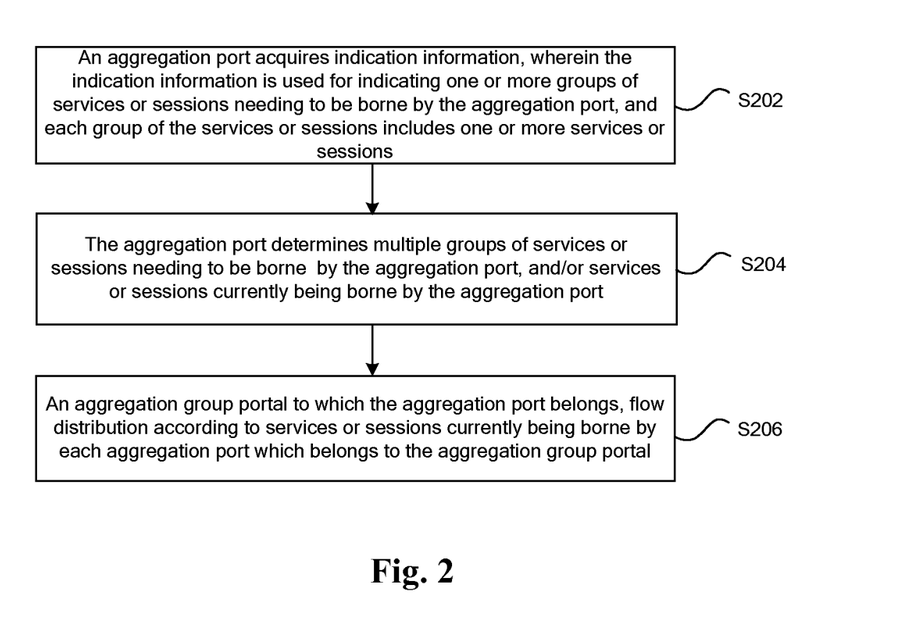
FIG. 2 is a flowchart of the method for negotiating the traffic path in the LAG according to an embodiment of the disclosure.

A method for negotiating a traffic path in an LAG is provided in the embodiment of the disclosure. FIG. 2 is flowchart of the method for negotiating the traffic path in the LAG according to an embodiment of the disclosure. As shown in FIG. 2, the method includes the following steps (Step 202 to Step 206).

Step 202: An aggregation port acquires indication information, wherein the indication information is used for indicating one or more groups of services or sessions needing to be borne by the aggregation port, each group of the services or sessions includes one or more services or sessions.

Step 204: The aggregation port determines multiple groups of services or sessions needing to be borne by the aggregation port, and/or services or sessions currently being borne by the aggregation port.

Step 206: An aggregation group portal to which the aggregation port belongs, performs traffic distribution according to services or sessions currently being borne by each aggregation port which belongs to the aggregation group portal.

Through the embodiment above, the aggregation port acquires indication information. The indication information is used for indicating one for more groups of services or sessions needing to be borne by the aggregation port. Each group of the services or sessions includes one or more services or sessions. The aggregation port determines multiple groups of services or sessions needing to be borne by the aggregation port, and/or services or sessions currently being borne by the ports. The aggregation group portal to which the aggregation port belongs, performs the traffic distribution according to services or sessions currently being borne by each aggregation port which belongs to the aggregation group portal. It is solved the problem in the related art that the same service or session cannot be transmitted bi-directionally on the same path, thus implementing the protection on the interconnect interface.

In the embodiment, in order to ensure the processing effect of the services or sessions, the services or sessions currently being borne by the aggregation port is a group of services or sessions with a highest priority among the multiple groups of services or sessions.

For the multiple services or sessions borne by the aggregation port, an example embodiment is provided in the embodiment. i.e. two ends or one end of the two ends of the aggregation group is respectively provided with its own service port distribution table. Multiple aggregation links which correspond to different services or sessions, are sequenced according to priorities for distributing the services.

During the process for implementing the above example embodiment, the indication information may be, but is not limited to a TLV field. The indication information may be carried in an LACP message.

Another example embodiment is provided, as to realize the method for negotiating the traffic path in the LAG according to the embodiment, specifically including the following steps.

Step 1: Two ends or one of the two ends of the aggregation group are or is respectively provided with its own service port distribution table. The multiple aggregation links which correspond to the different services or sessions, are sequenced according to priorities for distributing the services. On this basis, an example implement is provided in the embodiment. That is, in the aggregation group portal to which the aggregation port belongs, each service or session corresponds to one aggregation port sequence, wherein the aggregation port sequence is formed by sequencing aggregation ports in the aggregation group portal. The multiple aggregation ports in the aggregation port sequence are sequenced according to priorities for bearing the services or sessions. Optionally, the aggregation port sequence may be shown by a form of a service port distribution table.

Step 2: A service bearing priority sequence table of each port is obtained according to the service port distribution table. The service bearing priority sequence table is obtained according to the ports with various priorities in the service port distribution table. On this basis, an example implement is provided in the embodiment. That is, the multiple groups of services or sessions needing to be borne by the aggregation port are determined according to that each service or session in the aggregation group portal corresponds to one aggregation port sequence. The multiple groups of services or sessions needing to be borne by the aggregation port are formed by services or sessions corresponding to aggregation ports with different priorities in all aggregation port sequences. The corresponding relationship of the aggregation port and the multiple groups of services or sessions needing to be borne by the aggregation port may be embodied in a form of a service bearing priority sequence table.

Step 3: A new service negotiation TLV field is defined. The service negotiation TLV carries the service carrying the service bearing priority sequence table in which the aggregation port bears the services according to different priorities.

Step 4: After receiving the service negotiation TLV carrying the service bearing priority sequence table, the aggregation port will generate a service port distribution table of an opposite end. When a local end is also provided with a service distribution port table, the local end will compare the service port distribution table of the opposite end with its own service port distribution table. According to a strategy, i.e. the priority of the system or a master-slave relationship of the system, the local end determines whether it is necessary to modify its own service port distribution table according to information of the service port distribution table of the opposite end, so as to ensure that the two ends of the aggregation group are provided with a consistent service port distribution table. Therefore, the both ends distribute traffic according to such a service port distribution table, so as to further ensure that each aggregation link of the aggregation group carries the same traffic, and the traffic of the same service/session can be carried bi-directionally on the same path. When the local end is not provided with the service port distribution table, a service port distribution table of the local end will be constructed according to the received service negotiation TLV.

Based on the process above, an example implement is provided in the embodiment. That is, the aggregation group portal to which the aggregation port belongs modifies or sets, according to a predetermined strategy, the multiple groups of services or sessions needing to be borne by the aggregation port, and/or determines the services or sessions currently being borne by the aggregation port. The step that the aggregation port determines the multiple groups of services or sessions needing to be borne by the aggregation port includes that: the aggregation group portal to which the aggregation port belongs modifies, according to the predetermined strategy, the multiple groups of services or sessions needing to be borne by the aggregation port; the aggregation port determines, according to the multiple groups of services or sessions modified by the aggregation group portal, the multiple groups of services or sessions needing to be borne by the aggregation port.

The step that the aggregation group portal modifies, according to the predetermined strategy, the multiple groups of services or sessions needing to be borne by the aggregation port includes that: in the case that the multiple groups of services or sessions currently being borne by the aggregation port is inconsistent with the services or sessions indicated in the indication information, the aggregation group portal to which the aggregation port belongs judges, whether the multiple groups of services or sessions currently being borne by the aggregation port need to be modified, by comparing the priority of the aggregation group portal with the priority of an aggregation group portal to which the opposite-end aggregation port of the aggregation port belongs; or the aggregation group portal to which the aggregation port belongs judges, according to a master-slave relationship, whether the multiple groups of services or sessions currently being borne by the aggregation port need to be modified according to the indication information.

The step that judging, by the aggregation group portal to which the aggregation port belongs, according to their own priority relationship or their own master-slave relationship, whether the multiple groups of services or sessions currently being borne by the aggregation port need to be modified according to the indication information includes that: when the priority of the aggregation group portal is lower than the priority of the aggregation group portal to which the opposite-end aggregation port belongs, or the aggregation group portal is subordinate to the aggregation group portal to which the opposite-end aggregation port belongs, the aggregation group portal modifies, according to the indication information, the multiple groups of services or sessions currently being borne by the aggregation port.

The step that setting, by the aggregation group portal to which the aggregation port belongs, according to the predetermined strategy, the multiple groups of services or sessions needing to be borne by the aggregation port includes that: when the services or sessions currently being borne by the aggregation port have not been formed on the aggregation port, the aggregation group portal to which the aggregation ports belongs sets, according to the indication information, the multiple groups of services or sessions currently being borne by the aggregation port.

Step 5: When a certain aggregation link is unavailable, e.g. the aggregation link malfunctions, or the aggregation link is separated from the aggregation group, the changes of the service port distribution table at the two ends of the aggregation group are triggered, and the unavailable aggregation port is deleted from the service port distribution table.

When the aggregation link is recovered or joins the aggregation group again, and when the mode of the protection is a revertive mode, the aggregation link is recovered to the original place in the service port distribution table. A change of a port with the first priority in the service port distribution table triggers a change of traffic distributed by an aggregator on the aggregation port, thus recovering a service on the original malfunctioned aggregation link. When the mode of the protection is a non-revertive mode, the original malfunctioned aggregation link is just added to a port sequence of a current service port distribution table.

Based on the process above, an example implement is provided in the embodiment. The method provided by the embodiment further includes that when one or more aggregation links corresponding to the aggregation port malfunction or are unavailable, or are separated from an aggregation link group, the aggregation group portal to which the aggregation port belongs, shields the aggregation port corresponding to the one or more aggregation links from the aggregation port sequence, which corresponds to the services or sessions currently being borne by the aggregation port.

When the one or more aggregation links corresponding to the aggregation port are restored to be used or join the aggregation link group again, the aggregation group portal determines a protection mode. When the protection mode is a non-revertive mode, the aggregation port corresponding to the one or more aggregation links is added to the aggregation port sequence. When the one or more aggregation links corresponding to the aggregation port are restored to be used or join the aggregation link group again, the aggregation group portal determines a protection mode; when the protection mode is a revertive mode, the aggregation port corresponding to the aggregation links is recovered in the aggregation port sequence. In addition, when the protection mode is the revertive mode, the change of the aggregation port sequence triggers the change of the services or sessions currently being borne on the aggregation port.

The embodiments of the disclosure will be further described hereinafter through the embodiments and accompanying drawings.

Example Embodiment 1

Figure 3:
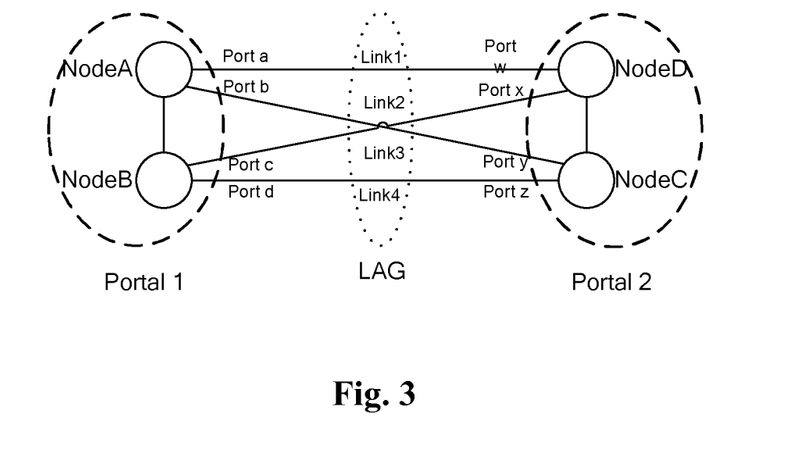
FIG. 3 is a networking diagram according to an example embodiment of the disclosure.

FIG. 3 is a networking diagram according to an example embodiment of the disclosure. As shown in FIG. 3, two ends of an aggregation group respectively both comprise a multiple nodes. Portal 1 comprise Node A and Node B. Portal 2 comprise Node C and Node D. Port a, Port b, Port c and Port d participate in aggregation at Portal 1. Port x, Port y, Port z and Port w participate in aggregation at Portal 2. Port a and Port w are interconnected into Aggregation Link 1; Port b and Port y are interconnected into Aggregation Link 2; Port c and Port x are interconnected into Aggregation link 3; and Port d and Port z are interconnected into Aggregation Link 4. Aggregation Link 1, Aggregation Link 2, Aggregation Link 3 and Aggregation Link 4 form an aggregation group. Node A and Node B in Portal 1 obtain a service port distribution table through negotiation. The service port distribution table of Portal 1 is as shown in Table 1.

TABLE 1

| Service | Port sequence |
|---------|---------------|
| 001 | Port a, Port b, Port c, Port d |
| 002 | Port b, Port c, Port d, Port a |
| 003 | Port c, Port d, Port a, Port b |
| 004 | Port d, Port a, Port b, Port c |
| ... | ... |

Node C and Node D in Portal 2 obtain a service distribution table through negotiation. The service port distribution table of Portal 2 is as shown in Table 2.

TABLE 2

| Service | Port sequence |
|---------|---------------|
| 001 | Port x, Port z, Port y, Port w |
| 002 | Port w, Port x, Port y, Port z |
| 003 | Port z, Port w, Port x, Port y |
| 004 | Port y, Port z, Port w, Port x |
| ... | ... |

Each table item of the service port distribution tables above may be obtained through a group of variable IDs: Aggregator_Vlan_XXXXXX_Oper_Port, wherein, a port with a first priority of the corresponding service is in the first place in a port sequence, and a port with a second priority of the corresponding service is in the second place, and the like.

In addition, each end of the aggregation group is provided with an Aggregator_Vlan_XXXXXX_Admin_Port, which is used for storing their respective original configuration and system settings. An initial value of the Aggregator_Vlan_XXXXXX_Oper_Port is from Aggregator_Vlan_XXXXXX_Admin_Port. An aggregator distributes the different service traffics onto different aggregation ports by parsing the Aggregator_Vlan_XXXXXX_Oper_Port.

Each aggregation port obtains its own service bearing priority sequence table according to a service port distribution table. The service bearing priority sequence table is obtained according to ports of various priorities in the service port distribution table. The table is identified by a series of Port_Oper_Vlan_List_X variables. Here, X identifies a priority.

Taking Aggregation Port a and Aggregation Port w for example as below, Table 3 shows a service bearing priority sequence table of the Aggregation Port a.

TABLE 3

| Priority | Bearing service |
|---|---|
| 1 | 001, 005, 009, . . . |
| 2 | 004, 006, 00A, . . . |
| 3 | 003, 007, 00B, . . . |
| 4 | 002, 008, 00C, . . . |

Table 4 shows a service bearing priority sequence table of the Aggregation Port w.

TABLE 4

| Priority | Bearing service |
|---|---|
| 1 | 002, 005, 010, . . . |
| 2 | 003, 006, 00A, . . . |
| 3 | 004, 007, 00B, . . . |
| 4 | 001, 008, 00C, . . . |

A service negotiation TLV field in a Link Aggregation Control Protocol (LACP) message carries service bearing priority sequence table of the corresponding aggregation port which sends the message. A format of the service negotiation TLV is as shown in Table 5.

TABLE 5

TLV_Type=Service information
Service_Information_Length
Service_List 1
Service_List 2
Service_List 3
......
End TLV where Service_List X is also a sub-type TLV and each Service_List_X includes information of Port_Oper_Vlan_List_X. A format of Service_List_X TLV is as shown in Table 6.

TABLE 6

Sub-TLV Type=Service List
List Number
Priority
List Length
Service List

Therefore, an LACP message sent from Port a and Port w carries a service negotiation TLV. A format of a TLV carried in the LACP message sent from Port a is as shown in Table 7.

TABLE 7

TLV_Type=Service information
Service_Information_Length

TABLE 7-continued

Sub-TLV Type=Service List
List Number=4
Priority=1
List Length=100
{002, 005, 010,......}
Priority=2
List Length=100
{003, 006, 00A,......}
Priority=3
List Length=100
{004, 007, 00B,......}
Priority=4
List Length=100
{002, 00B, 00C,......}
End TLV A format of a TLV carried in the LACP message sent from Port w is as shown in Table 8.

TABLE 8

TLV_Type=Service information
Service_Information_Length
Sub-TLV Type=Service List
List Number=4
Priority=1
List Length=100
{001, 005, 009,......}
Priority=2
List Length=100
{004, 006, 00A,......}
Priority=3
List Length=100
{003, 007, 00B,......}
Priority=4
List Length=100
{001, 00B, 00C,......}
End TLV Port a and Port w at two ends of the aggregation link send a service negotiation TLV to each other, generate, according to the received service negotiation TLV, a service bearing priority sequence table of the opposite end, and compare their own service bearing priority sequence table with the service bearing priority sequence table of the opposite end.

It can be seen from Table 7 and Table 8 that the service borne by each port is initially different, and then modifies its own service bearing priority sequence table according to a certain strategy, such as a system priority, a system Identifier (ID), or a master-slave relationship of the two ends of the aggregation group. It is assumed here that the system priority of Portal 1 is higher than that of Portal 2, or the Portal 1 is a master end while the Portal 2 is a slave end, therefore the Port w of Portal 2 is subordinate to a service borne by the Port a of Portal 1. Through the LACP negotiation, the service bearing priority sequence table of Port w is modified into that as shown in Table 3, so that the service bearing priority sequence table of the Port w is consistent with that of the Port a. Once the service bearing priority sequence table of the Port w is modified successfully, the service negotiation TLV in the LACP message sent by Port w is as shown in Table 7, which is consistent with the service negotiation TLV sent from the Port a.

When the information of the service negotiation TLV in an LACP message received by an aggregation port is consistent with the content of the service bearing table of the aggregation port, it means that the two aggregation port are consistent through negotiation. A service starts to be transmitted on the aggregation link (a state of the aggregator enters a distributing state). It can be ensured that bidirectional traffic of the same service are bidirectional on the same path.

Figure 4:
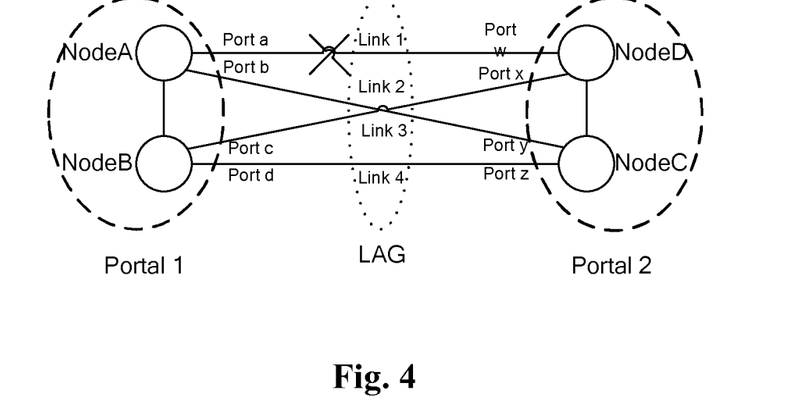
FIG. 4 is a schematic diagram illustrating a malfunction according to an embodiment of the disclosure.

When one of the aggregation links malfunctions or is separated from the aggregation group (for example, the Aggregation Link 1 malfunctions), a change of a port in the service port distribution table will be triggered at the moment. FIG. 4 is a schematic diagram illustrating a malfunction according to an embodiment of the disclosure. As shown in FIG. 4, the aggregation port is set to be unavailable in the service port distribution table. A service bearing priority sequence table of each aggregation port is triggered to be modified after the service port distribution table is modified, and the data traffic are redistributed according to the new service bearing priority sequence table.

When the aggregation link is recovered, the recovered aggregation port is reset to be available in the service port distribution table. It is necessary to determine a protection mode first. When the protection mode of the protection system is a revertive mode, the service bearing priority sequence table of each aggregation port is triggered to recover to the content before the malfunction, after the service port distribution table is modified, so that the traffic is recovered onto the aggregation link. When the protection mode of the protection system is a non-revertive mode, the modification of the service port distribution table will not trigger the service bearing priority sequence table of each aggregation port to change. Therefore, a current content of the service bearing priority sequence table of each aggregation port is maintained unchanged so as to avoid switching the current traffic.

Example Embodiment 2

The example embodiment 2 is similar to the example embodiment 1, except a difference that Portal 1 and Portal 2 in Embodiment 1 are both provided their own service port distribution tables and generate a service bearing table of each of their own aggregation ports, so that the service negotiation TLV can be sent according to the service bearing table and the two ends can be consistent through the negotiation of the two ends.

In the example embodiment, only one end is provided with its own service port distribution table. Here, it is assumed that Portal 1 is provided with its own service port distribution table, as shown in Table 1. Therefore, each aggregation port of Portal 1 will generate, according to the service port distribution table, its own service bearing priority sequence table. Provided that the service bearing priority sequence table of Port a is as shown in Table 3, then the service negotiation TLV in an LACP message sent by Port a is as shown in Table 5.

After receiving the service negotiation TLV from Port a, Port w of Portal 2, which is connected with Port a, will construct its own service bearing table and service bearing priority sequence table of the end according to the received service negotiation TLV of the opposite end due to the lack of its own service bearing priority sequence table. The service bearing priority sequence table of Port w will be maintained consistent with that of Port a.

By that analogy, after all aggregation ports, ports w, x, y, and z of Portal 2 have established their own service bearing priority sequence tables, Portal 2 establishes its own service port distribution table according to the service bearing priority sequence table of each port.

Once having established its own service bearing priority sequence table, each port will start transmitting information of its own service bearing table through a service negotiation TLV, so that two ends may be always consistent on the service transmission and the same service can be maintained bi-directionally on the same path.

Example Embodiment 3

The example embodiment 3 is different from the embodiment 1 and embodiment 2 in that a stream is identified in the embodiment, that is, stream id here. Negotiation involved in the example embodiment of the disclosure may be not only the negotiation of a service in a message, e.g. a Custom Virtual Local Area Network (VLAN) ID (C-VID), a Service VLAN ID (S-VID), a Backbone VLAN ID (B-VID) and a Backbone Service Instance ID (I-SID) etc., but also the negotiation of a stream id defined by two ends. The stream id defines a kind of data streams. The kind of data streams may refer to a group of Media Access Control (MAC) pairs that target MAC and source MAC are the same group, may refer to a group of Internet Protocol (IP) pairs that target IP and source IP are the same group, and may be also refer to the data streams with the same service ID, and so on.

Provided that IDs are defined for some specific data streams, stream IDs are as defined in Table 9.

TABLE 9

| Stream ID | MAC address pair | C-VID |
|---|---|---|
| 000001 | {01-03-05-07-09-0B, 02-04-06-08-0A-0C} | 100 |
| 000002 | {00-01-02-03-04-05, 06-07-08-09-0A-0B} | 200 |
| 000003 | {02-05-08-0B-0F-00, 03-07-0A-0D-10-13} | 300 |
| 000004 | {0F-0E-0D-0C-0B-0A, 09-08-07-06-05-04} | 400 |
| 000005 | . . . | . . . |

The stream IDs need to be negotiated and defined by two parties of an aggregation group. That is, data streams of the same kind are provided with the same stream ID. At the moment, what is interacted between the aggregation ports is no longer a service negotiation TLV, but a stream ID LTV.

Provided that it is at Portal 1, a corresponding relationship of an aggregation port of Portal 1 and a stream is as shown in Table 10.

TABLE 10

| Stream ID | Port sequence |
|---|---|
| 000001 | Port a, Port b, Port c, Port d |
| 000002 | Port b, Port c, Port d, Port a |
| 000003 | Port c, Port d, Port a, Port b |
| 000004 | Port d, Port a, Port b, Port c |
| . . . | . . . |

Provided that it is at Portal 2, a corresponding relationship of an aggregation port of Portal 2 and a stream is as shown in Table 11.

TABLE 11

| Stream ID | Port sequence |
|---|---|
| 000001 | Port x, Port z, Port y, Port w |
| 000002 | Port w, Port x, Port y, Port z |
| 000003 | Port z, Port w, Port x, Port y |
| 000004 | Port y, Port z, Port x, Port y |
| . . . | . . . |

Each table item in the tables of aggregation ports and streams may be obtained through a group of variable IDs: Aggregator_Stream_XXXXXX_Oper_Port. Wherein a port with a first priority of a corresponding data stream is in the first place in a port sequence, and a port with a second priority of a corresponding data stream is in the second plate, and the like.

In addition, each end of the aggregation group is provided with an Aggregator_Stream_XXXXXX_Admin_Port, which is used for storing the original configuration and system settings of a local end. The initial value of the Aggregator_Stream_XXXXXX_Oper_ Port is from Aggregator_Stream_XXXXXX_Admin_Port. An aggregator distributes traffic of different data streams onto different aggregation ports by parsing the Aggregator_Stream_XXXXXX_Oper_Port.

Each aggregation port obtains its own data stream bearing priority sequence table according to the data stream port distribution table. The data stream bearing priority sequence table is obtained according to ports of various priorities in the data stream port distribution table. The table is identified by a series of Port_Oper_Stream_List_X variables. Here, X identifies a priority.

Taking Aggregation Port a and Aggregation Port w for example as below, Table 12 shows a data stream bearing priority sequence table of Aggregation Port a.

TABLE 12

| Priority | Borne data stream |
|---|---|
| 1 | 000001, 000005, 000009, . . . |
| 2 | 000004, 000006, 00000A, . . . |
| 3 | 000003, 000007, 00000B, . . . |
| 4 | 000002, 000008, 00000C, . . . |

Table 13 shows a data stream bearing priority sequence table of Aggregation Port w.

TABLE 13

| Priority | Borne data stream |
|---|---|
| 1 | 000002, 000005, 000010, . . . |
| 2 | 000003, 000006, 00000A, . . . |
| 3 | 000004, 000007, 00000B, . . . |
| 4 | 000001, 000008, 00000C, . . . |

A data stream negotiation TLV field in an LACP message carries information of the data stream bearing priority sequence table corresponding to an aggregation port which sends the LACP message. The format of the data stream negotiation TLV is as shown in Table 14.

TABLE 14

TLV_Type=stream ID
Stream_ID_Length
Stream_ID_List 1
Stream_ID_List 2
Stream_ID_List 3
......
End TLV where Stream_ID_List X is also a sub-type TLV and each Stream_ID_List_X includes information of Port_Oper_Stream_List_X. The format of Stream_ID_X TLV is as shown in Table 15.

TABLE 15

Sub-TLV Type= Stream_ID List
List Number
Priority
List Length
Stream_ID List

Therefore, the LACP message sent from Port a and Port w carries a data stream negotiation TLV. The format of a TLV carried in the LACP message sent from Port a is as shown in Table 16.

TABLE 16

TLV_Type=Stream information
Stream ID Length
Sub-TLV Type=Stream_ID List
List Number=4
Priority=1
List Length=100
{000002, 000005, 000010,......}
Priority=2
List Length=100
{000003, 000006, 00000A,......}
Priority=3
List Length=100
{000004, 000007, 00000B,......}
Priority=4
List Length=100
{000002, 000008, 00000C,......}
End TLV The format of a TLV carried in the LACP message sent from Port w is as shown in Table 17.

TABLE 17

TLV_Type=Stream information
Stream ID Length
Sub-TLV Type=Stream_ID List
List Number=4
Priority=1
List Length=100
{000001, 000005, 000009,......}
Priority=2
List Length=100
{000004, 000006, 00000A,......}
Priority=3
List Length=100
{000003, 000007, 00000B,......}
Priority=4
List Length=100
{000001, 000008, 00000C,......}
End TLV Port a and Port w of the two ends of the aggregation link send a data stream negotiation TLV to each other, generate, according to the received data stream negotiation TLV, data stream bearing priority sequence table of the opposite end, and compare their own data stream bearing priority sequence table with the data stream bearing priority sequence table of the opposite end.

It can be seen from Table 12 and Table 13 that the initial bearing stream of each port are different, and then the data stream bearing priority sequence table of the each is modified according to a certain strategy, e.g. a system priority. It is assumed that the system priority of Portal 1 is higher than that of Portal 2, therefore the stream borne by Port w is subordinate to the stream borne by Port a. Through LACP negotiation, the data stream bearing priority sequence table of Port w is modified into that as shown in Table 12, so that the data stream bearing priority sequence table of Port w is consistent with that of Port a. Once the data stream bearing priority sequence table of Port w is modified successfully, information of the data stream negotiation TLV in the LACP message sent by Port w is as shown in Table 16 and is consistent with the data stream negotiation TLV sent from Port a.

When information of a data stream negotiation TLV in an LACP message received by an aggregation port is consistent with a content of a data stream bearing table of the aggregation port itself, it means that the two are consistent through negotiation. The specific data traffic starts to be transmitted on the aggregation link (a state of the aggregator enters a distributing state), and it can be ensured that bidirectional traffic of the same session are bidirectional on the same path.

When an aggregation link malfunctions or is separated from the aggregation group, an operational process thereof is similar to that of Embodiment 1, except that the service ID is changed into a stream ID.

In the embodiment, a stream ID, which is applied to distribution of a message and negotiation of the same path, may be applied to identify traffic of the same session, thus reducing a granularity for identifying different traffic, and enabling the load balance process of the aggregation group more uniform.

Figure 5:
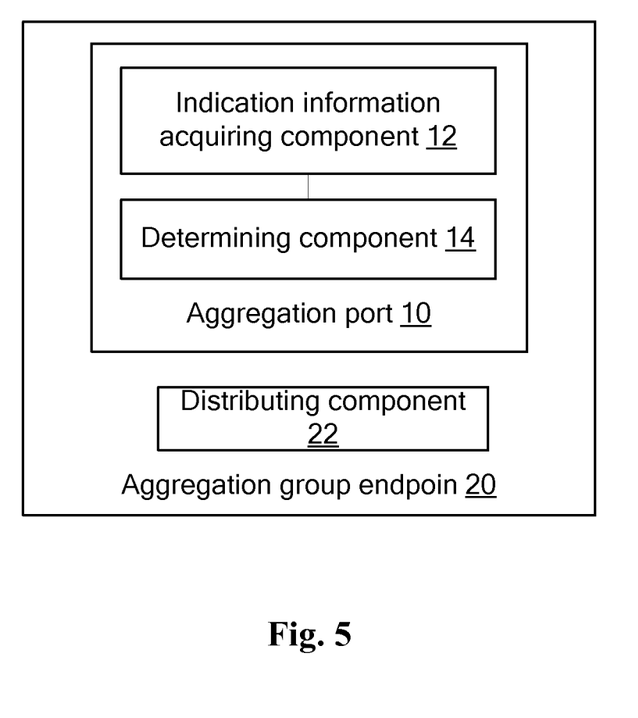
FIG. 5 is a structure block diagram of a device for negotiating the traffic path in the LAG according to an example embodiment of the disclosure.

Corresponding to the method for negotiating traffic path in an LAG according to the embodiments above, a device for negotiating the traffic path in the LAG is provided in the disclosure, so as to implement the embodiments above. FIG. 5 is a structure block diagram of a device for negotiating the traffic path in the LAG according to an example embodiment of the disclosure. As shown in FIG. 5, the device includes: an aggregation port 10, and an aggregation group portal 20 to which the aggregation port 10 belongs. FIG. 5 expresses a relationship of the two by illustrating that the aggregation port 10 belongs to the aggregation group portal 20. Of course, FIG. 5 only describes illustratively. Actually, the relationship of the two is further that the aggregation port 10 is subordinate to the aggregation group portal 20.

wherein the aggregation port 10 include: an indication information acquiring component 12, configured to acquire indication information, wherein the indication information is used for indicating one or more groups of services or sessions needing to be borne by the aggregation port, and each group of the services or sessions includes one or more services or sessions; a determining component 14, connected to the indication information acquiring component 12 and configured to determine multiple groups of services or sessions needing to be borne by the aggregation port, and/or services or sessions currently being borne by the aggregation ports.

The aggregation group portal 20 include: a distributing component 22, configured to perform traffic distribution according to services or sessions currently being borne by each aggregation port which belongs to the aggregation group portal.

Through the embodiment, the aggregation port acquires indication information, wherein the indication information is used for indicating one or more groups of services or sessions needing to be borne by the aggregation port, and each group of services or sessions includes one or more services or sessions; the aggregation port determines multiple groups of services or sessions needing to be borne by the aggregation port, and/or services or sessions currently being borne by the port; the aggregation group portal to which the aggregation port belongs performs the traffic distribution according to services or sessions currently being borne by each aggregation port. It is solved the problem in the related art that the same service or session cannot be transmitted bi-directionally on the same path, thus implementing the protection on the interconnect interface.

In the embodiment, the services or sessions currently being borne by the aggregation port is a group of services or sessions with the highest priority among the multiple groups of services or sessions. In the aggregation group portal to which the aggregation port belongs, each service or session corresponds to one aggregation port sequence, wherein the aggregation port sequence is formed by sequencing aggregation ports in the aggregation group portal. The multiple groups of services or sessions needing to be borne by the aggregation ports are determined according to that each service or session in the aggregation group portal corresponds to one aggregation port sequence. The multiple aggregation ports in the aggregation port sequence are sequenced according to the priorities for bearing the services or sessions. The multiple groups of services or sessions needing to be borne by the aggregation port are formed by services or sessions corresponding to aggregation port with different priorities in all aggregation port sequences. The aggregation group portal to which the aggregation port belongs, according to a predetermined strategy, modifies or sets, the multiple groups of services or sessions needing to be borne by the aggregation port, and/or determines the services or sessions currently being borne by the aggregation port.

For the process that the aggregation group portal modifies, according to the predetermined strategy, the multiple groups of services or sessions needing to be borne by the aggregation port, an example implement is provided in the embodiment. That is, the aggregation group portal further include: a modifying component, configured to modify according to the predetermined strategy, the multiple groups of services or sessions needing to be borne by the aggregation port; the determining component includes: a determining element, configured to determine, according to the multiple groups of services or sessions modified by the modifying component, the multiple groups of services or sessions needing to be borne by the port.

An example implement is provided in the embodiment. That is, the modifying component includes: a modification determining element, configured to, in the case that the multiple groups of services or sessions currently being borne by the aggregation port is inconsistent with the services or sessions indicated in the indication information, judge whether the multiple groups of services or sessions currently being borne by the aggregation port need to be modified, by comparing a priority of the aggregation group portal with a priority of an aggregation group portal to which an opposite-end aggregation port of the aggregation port belongs; or, a modification judging element, configured to judge, according to a master-slave relationship, whether the multiple groups of services or sessions currently being borne by the aggregation port need to be modified according to the indication information.

An example implement is provided in the embodiment. That is, the modifying component further includes: a first modifying element, configured to, when the priority of the aggregation group portal is lower than the priority of the aggregation group portal to which the opposite-end aggregation port of the aggregation port belongs, or the aggregation group portal to which the aggregation port belongs is subordinate to the aggregation group portal to which the opposite-end aggregation port of the aggregation port belongs, modify according to the indication information, the multiple groups of services or sessions currently being borne by the aggregation port.

Another example implement is provided in the embodiment. That is, the modifying component further includes: a second modifying element, configured to, when the services or sessions currently being borne by the aggregation port have not been formed on the aggregation port, set according to the indication information, the multiple groups of services or sessions currently being borne by the aggregation port.

The aggregation group portal further include: a shielding component, configured to, when one or more aggregation links corresponding to the aggregation port malfunction or are unavailable, or are separated from an aggregation link group, shield the aggregation port corresponding to the one or more aggregation links from the aggregation port sequence, which corresponds to the services or sessions currently being borne by the aggregation port.

The aggregation group portal further include: a first mode determining component, configured to determine, when the one or more aggregation links corresponding to the aggregation port are restored to be used or join the aggregation link group again, a protection mode; an adding component, configured to add, when the protection mode is a non-revertive mode, the aggregation port corresponding to the one or more aggregation links to the aggregation port sequence.

The aggregation group portal further include: a second mode determining component, configured to determine, when the one or more aggregation links corresponding to the aggregation port are restored to be used or join the aggregation link group again, a protection mode; a recovering component, configured to recover, when the protection mode is a revertive mode, the aggregation port corresponding to the one or more aggregation links in the aggregation port sequence. Optionally, when the protection mode is the revertive mode, a change of the aggregation port sequence triggers a change of the services or sessions currently being borne on the aggregation port.

It may be seen from the description above that a method for ensuring that the same service is bidirectional on the same path based on an LACP protocol, is provided in the embodiment of the disclosure, thus effectively ensuring that the same aggregation link bi-directionally at two ends of an aggregation group can be selected by the same service. That is the traffic of the same service/session selects the same aggregation link at the two ends of the aggregation group, thus satisfying the demand for protection and implementing protection on the interconnect interface.

Evidently, those skilled in the art shall understand that the respective components or steps of the disclosure may be implemented by a general-purpose computing device and may be integrated on a single computing device or distributed over a network consisting of a multiple computing devices. Optionally, they may be implemented using program codes executable by a computing device so that they may be stored in a storage device and executed by the computing device. In addition, the steps as illustrated or described may be executed according to a sequence different from that described herein in some cases, or they may be implemented by fabricating them into respective integrated circuit components respectively or by fabricating a multiple components or steps of them into a single integrated circuit component. Thus, the disclosure is not limited to any specific combination of hardware and software.

The foregoing descriptions are only preferred embodiments of the disclosure and are not used for limiting the disclosure. For those skilled in the art, the disclosure may have various alternations and changes. All modifications, equivalent replacements and improvements and the like made within the spirit and principle of the disclosure shall be included within the protection scope of the disclosure.

What is claimed is:

1. A method for negotiating a traffic path in a Link Aggregation Group (LAG), comprising:
   acquiring, by an aggregation port, indication information, wherein the indication information is used for indicating one or more groups of services or sessions needing to be borne by the aggregation port, and each group of the services or sessions comprises one or more services or sessions;
   determining, by the aggregation port, multiple groups of services or sessions needing to be borne by the aggregation port, and/or services or sessions currently being borne by the aggregation port;
   performing, by an aggregation group portal to which the aggregation port belongs, traffic distribution according to services or sessions currently being borne by each aggregation port which belongs to the aggregation group portal.

2. The method according to claim 1, wherein the services or sessions currently being borne by the aggregation port are one group of services or sessions with a highest priority among the multiple groups of services or sessions, wherein multiple aggregation ports in the aggregation port sequence are sequenced according to priorities for bearing the services or sessions, and the multiple groups of services or sessions needing to be borne by the aggregation port are formed by services or sessions corresponding to aggregation ports with different priorities in all aggregation port sequences.

3. The method according to claim 1, wherein in the aggregation group portal to which the aggregation port belongs, each service or session corresponds to one aggregation port sequence, wherein the aggregation port sequence is formed by sequencing aggregation ports in the aggregation group portal, wherein the multiple groups of services or sessions needing to be borne by the aggregation port are determined according to that the each service or session in the aggregation group portal corresponds to one aggregation port sequence.

4. The method according to claim 1, wherein the aggregation group portal to which the aggregation port belongs, according to a predetermined strategy, modifies or sets the multiple groups of services or sessions needing to be borne by the aggregation port, and/or determines the services or sessions currently being borne by the aggregation port.

5. The method according to claim 1, wherein determining, by the aggregation port, the multiple groups of services or sessions needing to be borne by the aggregation port comprises:
   modifying, by the aggregation group portal to which the aggregation port belongs, according to a predetermined strategy, the multiple groups of services or sessions needing to be borne by the aggregation port;
   determining, by the aggregation port, according to the multiple groups of services or sessions modified by the aggregation group portal, the multiple groups of services or sessions needing to be borne by the aggregation port.

6. The method according to claim 4, wherein modifying, by the aggregation group portal, according to the predetermined strategy, the multiple groups of services or sessions needing to be borne by the aggregation port comprises:

based on that the multiple groups of services or sessions currently being borne by the aggregation port are inconsistent with the services or sessions indicated in the indication information, judging, by the aggregation group portal to which the aggregation port belongs, whether the multiple groups of services or sessions currently being borne by the aggregation port need to be modified, by comparing a priority of the aggregation group portal with a priority of an aggregation group portal to which an opposite-end aggregation port of the aggregation port belongs;

or judging, by the aggregation group portal to which the aggregation port belongs, according to a master-slave relationship, whether the multiple groups of services or sessions currently being borne by the aggregation port need to be modified according to the indication information;

wherein judging, by the aggregation group portal to which the aggregation port belongs, according to priority relationship or master-slave relationship of the aggregation group portal, whether the multiple groups of services or sessions currently being borne by the aggregation port need to be modified according to the indication information comprises: based on that the priority of the aggregation group portal to which the aggregation port belongs is lower than the priority of the aggregation group portal to which the opposite-end aggregation port of the aggregation port belongs, or the aggregation group portal to which the aggregation port belongs is subordinate to the aggregation group portal to which the opposite-end aggregation port of the aggregation port belongs, modifying, by the aggregation group portal, according to the indication information, the multiple groups of services or sessions currently being borne by the aggregation port.

7. The method according to claim 4, wherein setting, by the aggregation group portal to which the aggregation port belongs, according to the predetermined strategy, the multiple groups of services or sessions needing to be borne by the aggregation port comprises:

based on that services or sessions currently being borne by the aggregation port have not been formed on the aggregation port, setting, by the aggregation group portal to which the aggregation port belongs, according to the indication information, the multiple groups of services or sessions currently being borne by the aggregation port.

8. The method according to claim 1, wherein the method further comprises:

when one or more aggregation links corresponding to the aggregation port malfunction or are unavailable, or are separated from an aggregation link group, shielding, by the aggregation group portal to which the aggregation port belongs, the aggregation port corresponding to the one or more aggregation links from an aggregation port sequence, which corresponds to the services or sessions currently being borne by the aggregation port.

9. The method according to claim 8, wherein the method further comprises:

when the one or more aggregation links corresponding to the aggregation port are restored to be used or join the aggregation link group again, determining, by the aggregation group end point, a protection mode;

when the protection mode is a non-revertive mode, adding the aggregation port corresponding to the one or more aggregation links to the aggregation port sequence.

10. The method according to claim 8, wherein the method further comprises:

when the one or more aggregation links corresponding to the aggregation port are restored to be used or join the aggregation link group again, determining, by the aggregation group portal, a protection mode;

when the protection mode is a revertive mode, recovering the aggregation port corresponding to the one or more aggregation links in the aggregation port sequence, and/or, when the protection mode is the revertive mode, a change of the aggregation port sequence triggers a change of the services or sessions currently being borne on the aggregation port.

11. A device for negotiating traffic path negotiation in a Link Aggregation Group (LAG), comprising an aggregation port, and an aggregation group portal to which the aggregation port belongs, wherein the aggregation port comprises:

an indication information acquiring component, configured to acquire indication information, wherein the indication information is used for indicating one or more groups of services or sessions needing to be borne by the aggregation port, and each group of the services or sessions comprises one or more services or sessions;

a determining component, configured to determine multiple groups of services or sessions needing to be borne by the aggregation port, and/or services or sessions currently being borne by the aggregation port;

the aggregation group portals comprises: a distributing component, configured to perform traffic distribution according to services or sessions currently being borne by each aggregation port which belongs to the aggregation group portal.

12. The device according to claim 11, wherein the services or sessions currently being borne by the aggregation port is a group of services or sessions with a highest priority among the multiple groups of services or sessions, wherein multiple aggregation ports in the aggregation port sequence are sequenced according to priorities for bearing the services or sessions, and the multiple groups of services or sessions needing to be borne by the aggregation port are formed by services or sessions corresponding to aggregation ports with different priorities in all aggregation port sequences.

13. The device according to claim 11, wherein in the aggregation group portal to which the aggregation port belongs, each service or session corresponds to one aggregation port sequence, wherein the aggregation port sequence is formed by sequencing aggregation ports in the aggregation group portal, wherein the multiple groups of services or sessions needing to be borne by the aggregation port are determined according to that the each service or session in the aggregation group portal corresponds to one aggregation port sequence.

14. The device according to claim 11, wherein the aggregation group portal to which the aggregation port belongs, according to a predetermined strategy, modifies or sets, the multiple groups of services or sessions needing to be borne by the aggregation port, and/or determines the services or sessions currently being borne by the aggregation port.

15. The device according to claim 11, wherein
the aggregation group portal further comprises: a modifying component, configured to modify according to a predetermined strategy, the multiple groups of services or sessions needing to be borne by the aggregation port;

the determining component comprises: a determining element, configured to determine, according to the multiple groups of services or sessions modified by the modifying component, the multiple groups of services or sessions needing to be borne by the aggregation port.

16. The device according to claim 14, wherein the modifying component comprises:
a modification determining element, configured to, based on that the multiple groups of services or sessions currently being borne by the aggregation port are inconsistent with the services or sessions indicated in the indication information, judge whether the multiple groups of services or sessions currently being borne by the aggregation port need to be modified, by comparing a priority of the aggregation group portal with a priority of an aggregation group portal to which an opposite-end aggregation port of the aggregation port belongs; or,
a modification judging element, configured to judge, according to a master-slave relationship, whether the multiple groups of services or sessions currently being borne by the aggregation port need to be modified according to the indication information;
wherein the modifying component further comprises: a first modifying element, configured to, based on that the priority of the aggregation group portal to which the aggregation port belongs is lower than the priority of the aggregation group portal to which the opposite-end aggregation port of the aggregation port belongs, or the aggregation group portal to which the aggregation port belongs is subordinate to the aggregation group portal to which the opposite-end aggregation port of the aggregation port belongs, modify according to the indication information, the multiple groups of services or sessions currently being borne by the aggregation port.

17. The device according to claim 14, wherein the modifying component further comprises:
a second modifying element, configured to, based on that services or sessions currently being borne by the aggregation port have not been formed on the aggregation port, set according to the indication information, the multiple groups of services or sessions currently being borne by the aggregation port.

18. The device according to claim 11, wherein the aggregation group portal further comprises:
a shielding component, configured to, when one or more aggregation links corresponding to the aggregation port malfunction or are unavailable, or are separated from an aggregation link group, shield the aggregation port corresponding to the one or more aggregation links from an aggregation port sequence, which corresponds to the services or sessions currently being borne by the aggregation ports.

19. The device according to claim 18, wherein the aggregation group portal further comprises:
a first mode determining component, configured to determine, when the one or more aggregation links corresponding to the aggregation port are restored to be used or join the aggregation link group again, a protection mode;
an adding component, configured to add, when the protection mode is a non-revertive mode, the aggregation port corresponding to the one or more aggregation links to the aggregation port sequence.

20. The device according to claim 18, wherein the aggregation group portal further comprises:
a second mode determining component, configured to determine, when the one or more aggregation links corresponding to the aggregation port are restored to be used or join the aggregation link group again, a protection mode;
a recovering component, configured to recover, when the protection mode is a revertive mode, the aggregation port corresponding to the one or more aggregation links in the aggregation port sequence; and/or when the protection mode is the revertive mode, a change of the aggregation port sequence triggers a change of the services or sessions currently being borne on the aggregation port.

* * * * *